J. B. JAKSCH.
FIRE ESCAPE.
APPLICATION FILED NOV. 12, 1914.

1,251,780.

Patented Jan. 1, 1918.
8 SHEETS—SHEET 1.

Fig. 1.

Witnesses
G. M. Spring

Inventor
John B. Jaksch.
By Richard Beaver,
his Attorney

J. B. JAKSCH.
FIRE ESCAPE.
APPLICATION FILED NOV. 12, 1914.

1,251,780.

Patented Jan. 1, 1918.
8 SHEETS—SHEET 6.

J. B. JAKSCH.
FIRE ESCAPE.
APPLICATION FILED NOV. 12, 1914.

1,251,780.

Patented Jan. 1, 1918.
8 SHEETS—SHEET 7.

Witnesses
G. M. Spring

Inventor
John B. Jaksch.

By
his Attorney

J. B. JAKSCH.
FIRE ESCAPE.
APPLICATION FILED NOV. 12, 1914.

1,251,780.

Patented Jan. 1, 1918.
8 SHEETS—SHEET 8.

Inventor
John B. Jaksch.

Witnesses
G. M. Spring.

By
his Attorney

UNITED STATES PATENT OFFICE.

JOHN B. JAKSCH, OF MILWAUKEE, WISCONSIN.

FIRE-ESCAPE.

1,251,780.  Specification of Letters Patent.  Patented Jan. 1, 1918.

Application filed November 12, 1914. Serial No. 871,738.

*To all whom it may concern:*

Be it known that I, JOHN B. JAKSCH, a subject of the Emperor of Austria, residing at Milwaukee, in the county of Milwaukee and State of Wisconsin, have invented certain new and useful Improvements in Fire-Escapes, of which the following is a specification.

My invention relates to fire-escapes and its main object is to provide a novel and highly efficient device which may be located at a window-opening and serve as a substitute for the usual sashes, due regard being given to compactness and simplicity, number and strength of the various parts employed, considering the nature of the invention and numerous functions performed by its different parts.

Among the more specific objects of the invention are:—

First, the provision of means whereby when an operating member is actuated, window sashes will automatically fall to a lowermost position;

Second, means whereby upon actuation of said operating member, a carriage frame will move to position through the exposed window opening, and whereby escape carriages may travel exteriorly of the window opening and beyond the building;

Third, means whereby upon actuation of said operating member, a step is lowered to facilitate mounting into the escape carriages;

Fourth, means whereby the carriage frame will be automatically locked through its movement to the projected position;

Fifth, means whereby an escape carriage or carriages may be released through movement of said carriage frame to the projected position;

Sixth, means manually operable whereby the main carriage carrying the escape carriages may be released for travel to the position exteriorly of the window;

Seventh, means manually operable whereby the escape carriages may be released for descent while in position exteriorly of the window; and Eighth, means whereby the speed at which the escape carriages descend is governed or checked.

Additional and minor objects will appear hereinafter from the description following, taken in connection with drawings accompanying this application, which drawings illustrate the present and preferred embodiment.

In said drawings:—

Fig. 5 is a vertical sectional view of Fig 4 showing the parts in projected position;

Fig. 8 is a detail view showing one of the resilient or outwardly pressed arms of the main carriage frame in position to positively maintain the frame projected;

Throughout the drawings, like reference characters designate like or similar parts.

Referring to the drawings, A designates a substantially rectangular frame adapted to be mounted in a window opening. This frame has fastened thereto rails 1 in such manner as to define a rectangular frame to fill the window space. To the frame is attached in any suitable manner a box 2 in which are mounted the parts adapted to be actuated in order to actuate the escape proper. In this box may be mounted a lamp at 3, which lamp may be continuously lighted or especially lighted at night so that an operator can readily see the location of the parts. Within the box is mounted an operating lever comprising a handle 4 and connecting links 5. One of the arms 5 is pivoted at 6, to a bracket 8, while the other arm is pivoted in one side of the box.

Figure 10:
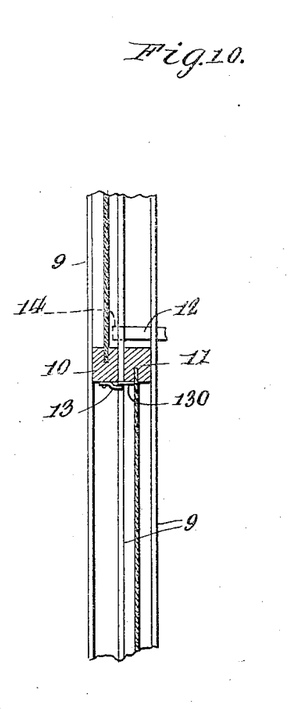
Fig. 10 is a fragmentary vertical sectional view showing one of the latches in position for maintaining the upper sash elevated.

The side rails of frame A are provided with suitable grooves, which are formed by means of strips 9, in which grooves slide upper and lower sashes designated 10 and 11 respectively. The upper sash is adapted to be maintained in its highest position by means of slidable bolt members 12. Bolts 12 slide in suitable brackets 13 fastened to the side rails of the frame A and also slide into recesses 14 provided in the side rails of the sash 10 as shown in Fig. 10. As to the lower sash, the same is maintained in mid-position by means of a slidable sill designated 15.

Means is provided whereby when the operating lever member is actuated, the bolts 12 and sill 15 will be shifted so that the sashes 10 and 11 may fall by gravity into the lowest portion of the frame A and out of the path of movement of a swinging track frame, later to be described.

Figure 2:
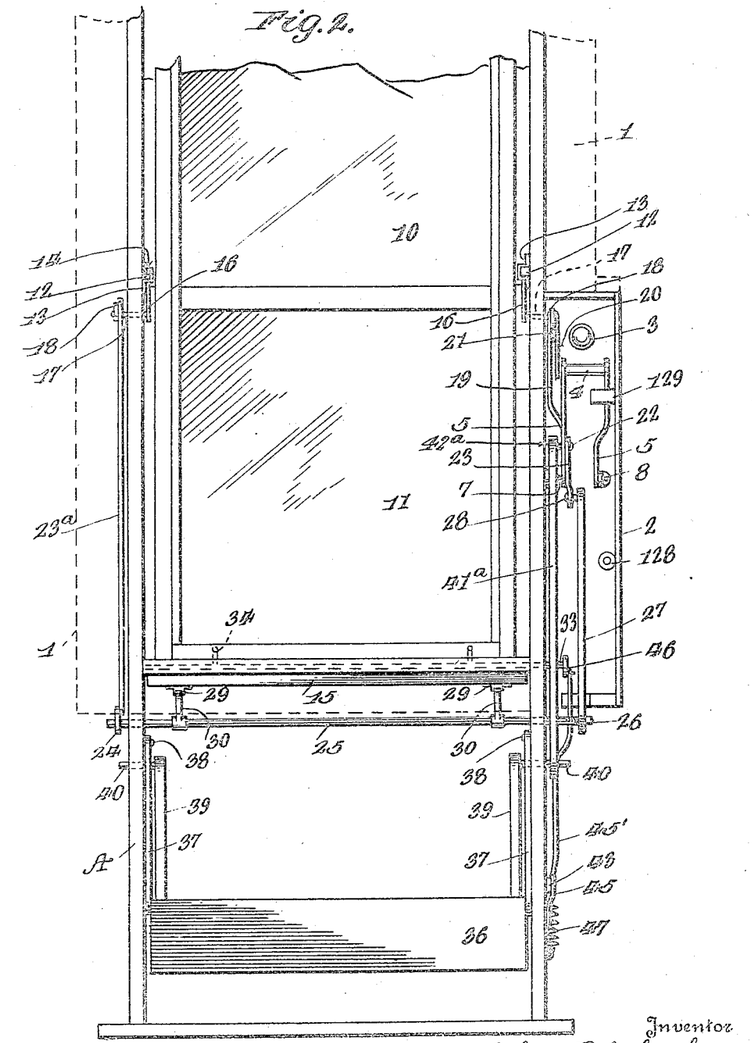
Fig. 2 is an elevation viewed from the interior showing the lower portion of the apparatus.
Figures 6, 7, 9:
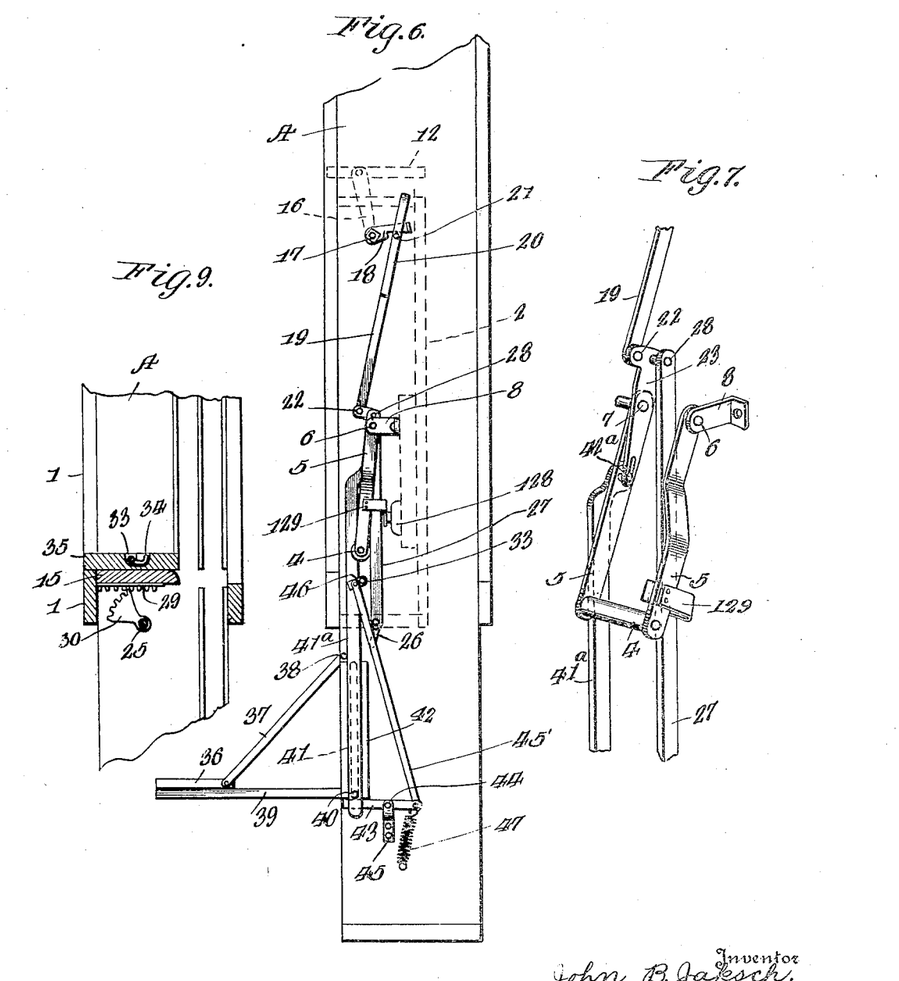
Fig. 6 is an end elevation of the lower portion of the device showing the step lowering mechanism and the step in operative position.
Fig. 7 is a perspective view of the operating lever and associated parts showing the lever for tilting the track frame and step.
Fig. 9 is a fragmentary vertical section, showing the movable sill for the window sashes withdrawn, also, the means for holding the carriage frame against swinging movement.

As to the means for shifting the bolt 12, each bolt has pivoted thereto an arm 16 to which is rigidly fastened by means of a pin 17 extending through one side rail of the frame A, a crank arm designated 18. This crank arm 18 extends into an elongated slot provided on a link member 19 by means of a looped portion at 20. Across the slot extends a pin 21, being mounted in the looped portion, which pin is adapted to directly engage the crank arm 18 so as to shift it. Shifting member 19 is pivoted to the operating lever by means of a pivot at 22 provided on an arm 23 fastened directly to one side arm 5 of the operating lever. It should be borne in mind that the parts described are connected to and adapted to operate that one of the bolts 12 nearest the operating lever. The opposite bolt 12 has connected thereto pivotally an arm 16 having rigidly fastened thereto by means of a pin 17 a crank arm 18. The latter crank arm has pivoted thereto a link or arm 23ª see Fig. 2 which is in turn pivoted to a crank 24 provided on a transverse rod 25, the rod being provided with a crank at 26. To the crank 26 is pivoted an arm or link 27 which is in turn pivoted at 28 to the arm 23 on one of the lever arms 5 as best seen in Fig. 7. It is to be noted that the pivots 22 and 28 are offset with respect to the pivot points 6 and 7 so that the necessary leverage is provided for actuation of the parts described.

Now with respect to the means for shifting or sliding the sill 15, the sill has provided on its under side a plurality of racks 29, the teeth of which are adapted to mesh with the teeth of gear segments 30 keyed to the rod 25.

Figure 4:
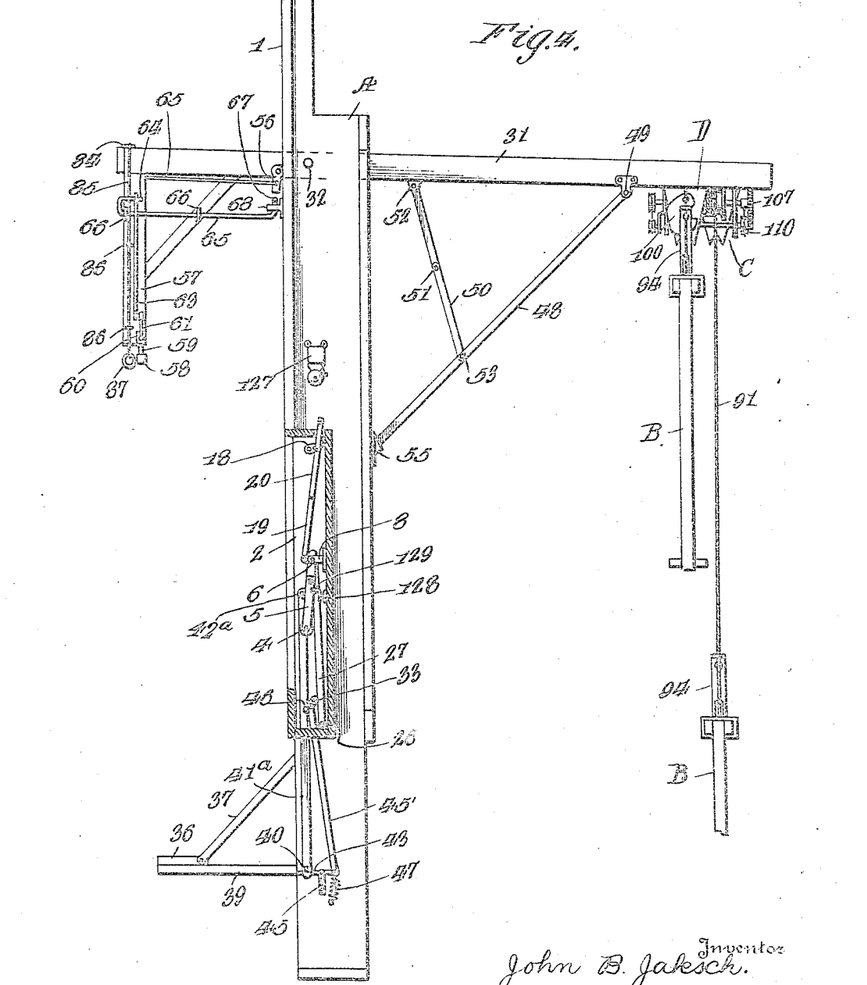
Fig. 4 is a side elevation, partly in section, showing the parts in projected position with one of the escape carriages descending on the outside of the building.
Figures 5, 8, 17:
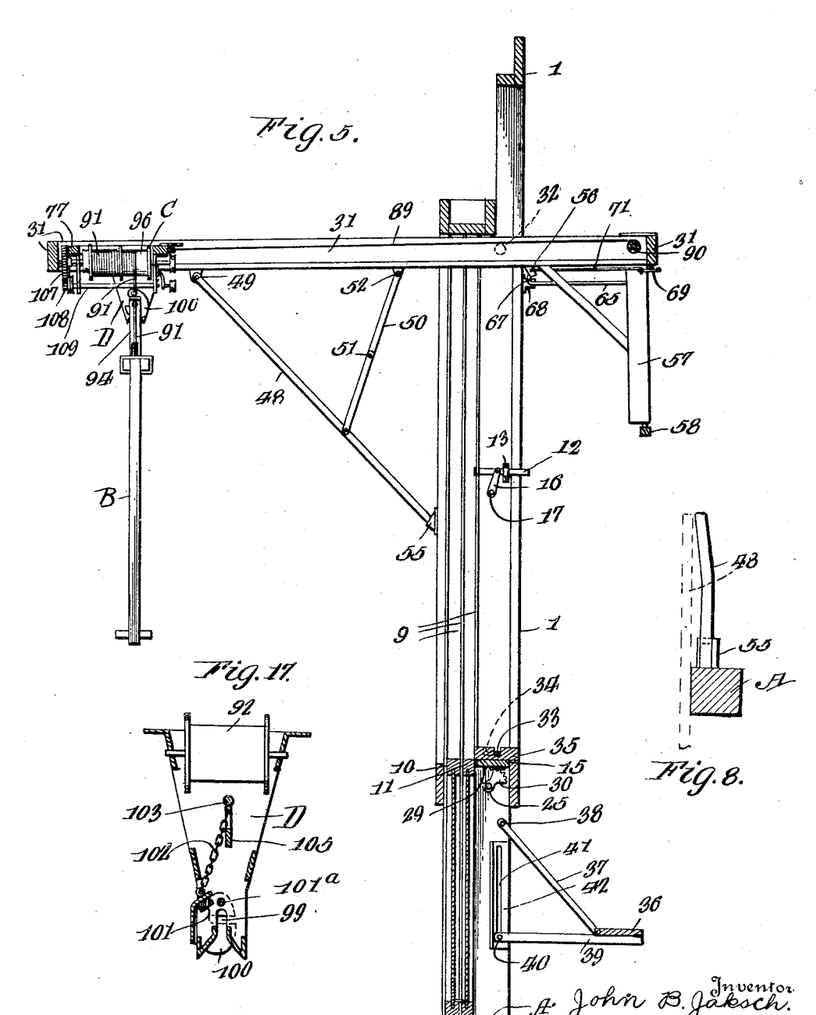

A frame for supporting a truck carrying escape carriages later to be described, is provided and comprises a substantially rectangular structure having rails designated 31, the two side rails being pivoted as at 32, off center, to the side rails of the frame A. This frame is adapted to be normally maintained closed and within the frame A. Due to the off center connection of said frame, when it is not positively fastened in the frame A, it will move on its pivot and assume a position slightly inclined to the horizontal as shown in Figs. 4 and 5. Therefore, means is provided whereby the frame is maintained locked within the frame A until the operating lever is actuated. The specific means shown consists of a retainer member or rod designated 33 which has provided thereon one or more lugs designated 34, which lugs are adapted for abutment of the escape swinging track frame directly thereagainst. This rod is pivoted in the frame A and extends transversely of said frame and is located in a sill designated 35. When said carriage frame is fastened within frame A, the lugs 34 project above the upper surface of the sill 35 and when the frame is released, the lugs 34 are below the surface of said sill 35. The specific means for shifting the retainer rod will be later described as it co-operates with means for shifting another part, namely a step.

Said step is designated 36 and forms part of a step device. Brace arms are pivoted to the step 36 and designated 37, said arms being also pivoted at 38 to the side rails of frame A. Supporting arms or bars 39 are fastened to the step and projecting laterally from each of them are pins designated 40. The pins 40 are mounted for travel in elongated slots 41 provided in the side rails of frame A. On the inner side of said side rails, wear plates 42 are provided and these also have elongated slots which register with the elongated slots 41 in the side rails.

With respect to the means for lowering or projecting the step outwardly from the frame A, one of the pins 40 has pivoted thereto an arm or link 41ᵃ which is in turn pivoted at 42ᵃ to one arm 5 of the operating lever shown in Fig. 7.

A lever 43 is mounted in the path of movement of the last-mentioned pin 40, which lever is pivoted at 44 to a bracket 45 fastened to the frame A. Through the movement of this lever 43, the retainer rod or member 33 is adapted to be shifted and in order to enable this function to take place, a link or arm 45′ is pivoted to lever 43 and pivoted to a crank arm 46 rigidly fastened on the rod 33. A spiral spring 47 is connected to the lever 43 and to the frame A, serving to normally draw said lever 43 downwardly and accordingly the retainer rod 33 in position with its lugs 34 projected above the upper surface of the sill 35.

Figure 1:
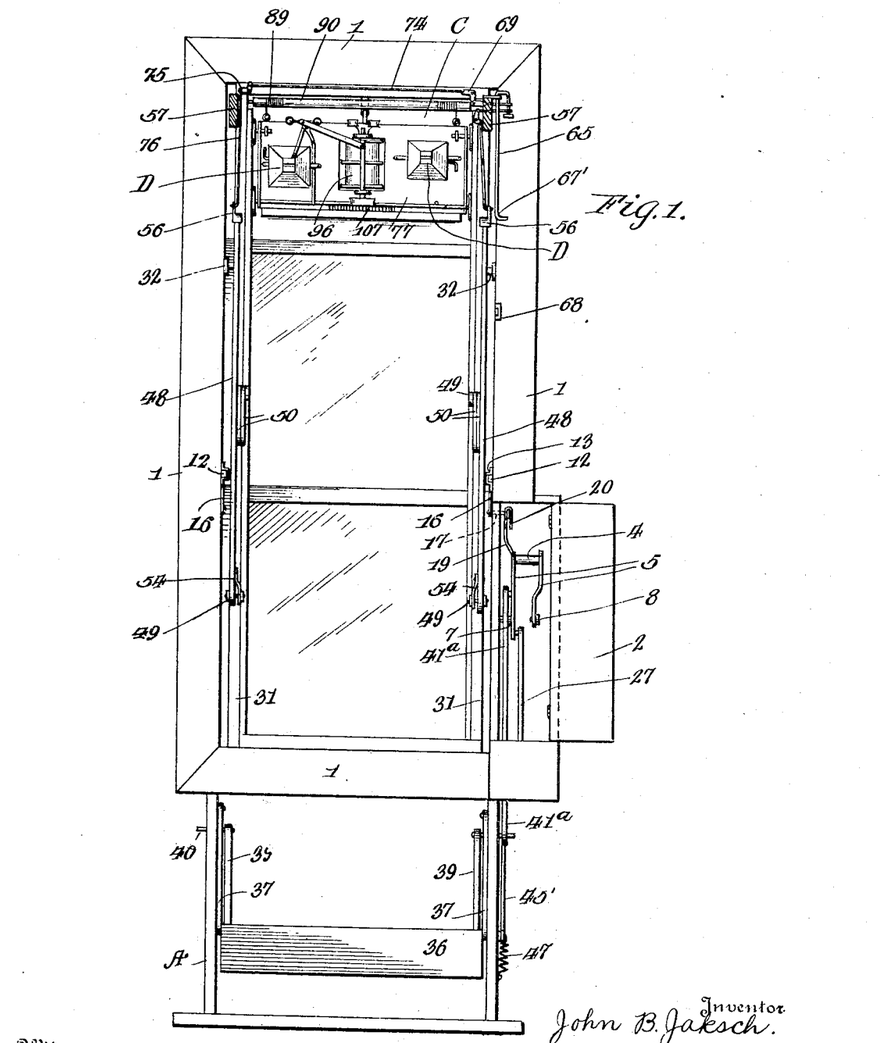
Figure 1 is a rear elevation viewed from the interior.
Figures 14, 15, 16:
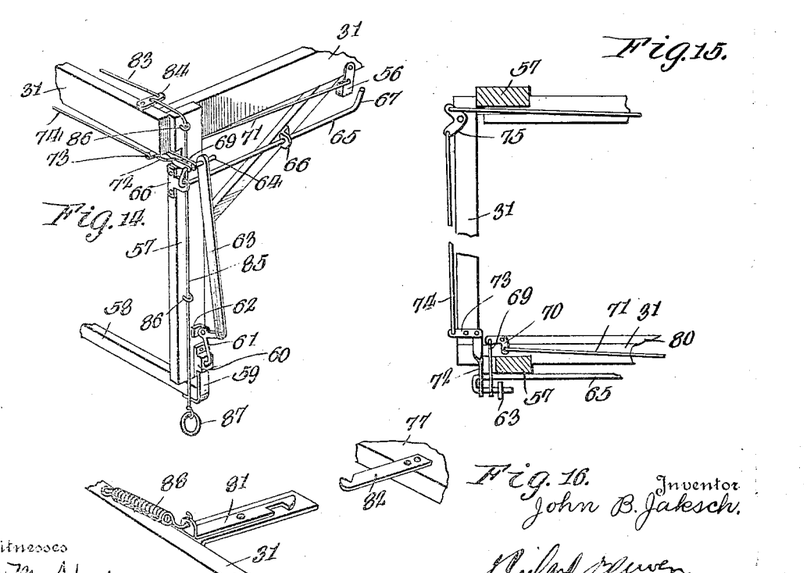
Fig. 14 is a detail perspective view of parts of the track, illustrating the means operable to release the escape carriages.
Fig. 15 is an inverted plan view of part of the track illustrating the means for maintaining the bar closed, which supports the escape carriages.
Fig. 16 is a detail perspective view of the latch means for maintaining the truck on its frame against movement; and, Fig. 17 is a detail view partly in section illustrating one of the clasp devices for supporting the escape carriages.

As the pins 34 move out of the path of movement of the swinging track frame composed of the rails 31, said frame due to its off center pivotal mounting, will move to the position shown in Figs. 4 and 5. Support arms or brace rods designated 48 are provided for the frame last mentioned and are pivoted thereto as at 49. The extent of movement of the brace rods 48 is limited through the provision of the links at 50 which links are pivoted together at 51, one set being pivoted to the rails 31 at 52 and the other set being pivoted to the brace rods at 53. Brace rods 48 are loosely mounted on the pivot 49 and have a slight lateral and pivotal movement thereon in a horizontal plane. Such lateral movement is against the tension of leaf springs designated 54 in Figs. 1 and 3, bearing against the brace rods 48 and against suitable projections on the pivots 49. These rods 48 after they have moved past the frame A are adapted to be sprung laterally by means of the springs 54 into engagement with keepers 55 provided on the frame A as shown in Fig. 8. In order to hold the brace rods 48 in proper position during swinging movement of the swinging track frame, holders 56 are pivoted to the swinging track frame. These holders 56 shown in Fig. 14, are adapted to be actuated to release the rods 48 by means later to be described.

Figure 3:
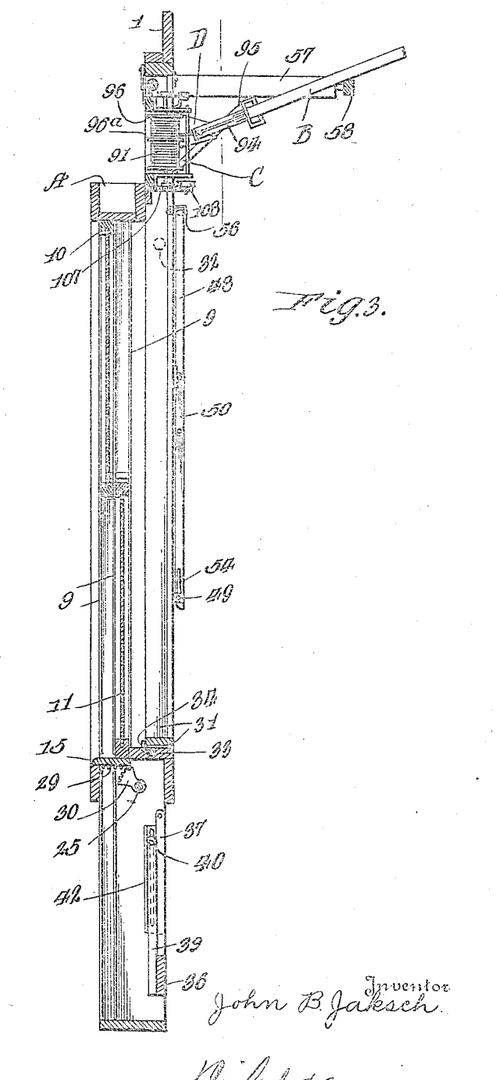
Fig. 3 is a vertical sectional view showing the parts in closed position with the car inside of the room.

Escape carriages B of any suitable design are employed, these escape carriages being pendently supported as shown in the drawings. When the parts are folded, these carriages B are adapted to be located and supported in convenient position. To this end an auxiliary frame is provided on the swinging track frame and consists of side bars 57, carrying a transverse bar 58 on which the carriages B are adapted to rest as seen in Fig. 3. This transverse bar 58 is pivoted at one end and detachably fastened at its other end, so that it may be released at the proper time through movement of the swinging track frame. As to the specific fastening means shown, a hasp lug 59 (shown in Fig. 14) is provided on the bar 58 which is adapted to enter a keeper 60 fastened to one of the bars 57. The keeper lugs have registering slots which are adapted to be entered by a lock member shown in the form of a bell crank lever designated 61, the lever being pivoted to the bracket 62 fastened to one rail 57. It will readily be understood that only one arm of the lever 61 enters the openings of the keeper 60. The other arm of this lever 61 has pivoted thereto a link 63 which is in turn pivoted to a crank arm 64 provided on a shifting member or rod 65, the latter being journaled in brackets 66 mounted on adjacent parts of the swinging track frame. This shifting arm or rod 65 at one end is provided with an angle arm or lug 67. Upon movement of the swinging track frame from a perpendicular to a horizontal position, lug 67 is adapted to strike against an abutment 68 provided on the frame having the rails 1, see Fig. 1, for the purpose of rocking the member 65, accordingly shifting the bell crank lever 61 and releasing or unlocking the bar 58 so that the carriages B will hang pendently from the swinging track frame.

The holders previously referred to and designated 56 are adapted to be shifted upon movement of the shifting member 65 so as to release the brace rods 48. To this end, a link 69 is pivoted to the crank 64 and to a bell crank lever 70 pivoted to the swinging track frame. Bell crank lever 70 has pivoted thereto a connecting arm or rod 71 which is pivoted to one of the holders 56, as in Fig. 14. Also connected to the crank 64 is an arm 72 pivoted to a lever 73 pivoted to the swinging track frame and to a link 74. The latter link is pivoted to a bell crank lever 75, the lever being pivoted to the swinging track frame and to a link or arm 76 pivoted to the other holder member 56.

Figure 11:
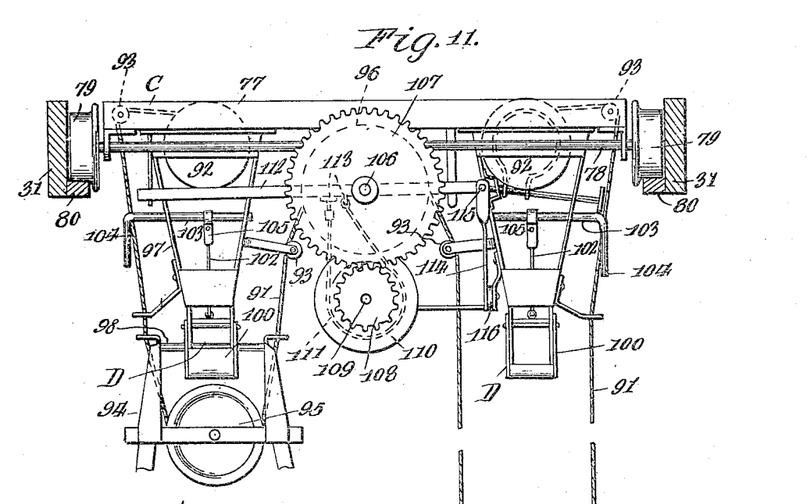
Fig. 11 is a rear elevation of the truck and escape carriages, together with the track on which the truck travels, the track being shown in section.
Figure 12:
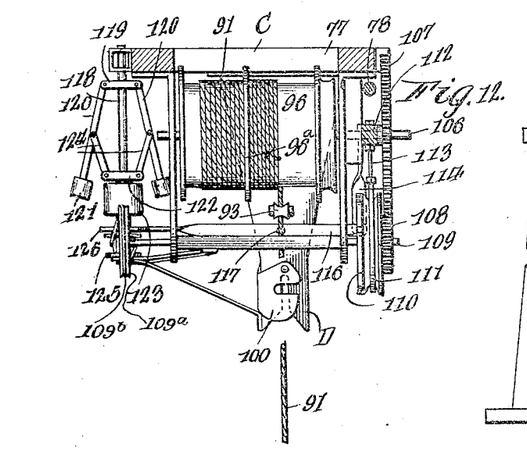
Fig. 12 is a transverse section through the main carriage showing the arrangement of the speed governing apparatus with relation to the main winding drum.
Figure 13:
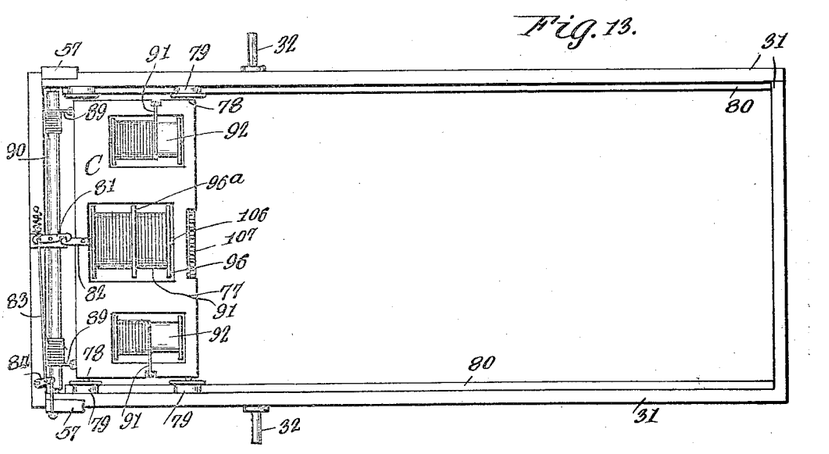
Fig. 13 is a plan view of the truck showing it in the position on the projectable frame.

The escape carriages B are carried by a slidable carriage or truck designated C. This truck has a body designated 77, also axles designated 78 on which are mounted wheels or rollers 79. The side rails 31 of the swinging track frame have provided on their inner faces suitable track rails 80 on which the wheels 79 travel as best seen in Figs. 11 and 13. This truck is normally locked at the inner end of the swinging track frame by means of a pivoted latch designated 81 which has a hook which engages a hook of a lug 82 carried by the body 77. This slidable carriage is not adapted to travel until the carriages B or one of them is occupied. The occupant may operate suitable means to release the truck, which means may be as follows. To the latch 81 is pivoted a link 83, which link is pivoted to a lever 84 having a pendent cord member 85 connected thereto, which cord member passes through suitable guide members 86 on one of the rails 57 and at its free end is provided with a grip ring designated 87. A spring 88 as shown in Fig. 16, is fastened to the swinging track frame and to the latch 81, serving to normally maintain said latch 81 in engagement with the lug 82.

Means is provided to retard the sliding movement of the truck C after its release subsequent to actuation of the latch 81, which means consists of a flexible member or members 89 connected to the body 77 of the carriage and connected to and wound around a roller or drum 90 mounted for rotation in the side rails 31 of the carriage frame.

The carriages B are supported from the truck or carriage C as stated and have directly connected thereto cables or ropes designated 91, passing over suitable drums and other parts as will now be described. The cables of the carriages B are fastened to suitable drums 92 mounted in the body 77, the cables being partially wrapped around said drums. Said cables after passing from the drums 92 pass over guide pulleys 93 carried by the body 77 as shown in Fig. 11, and then pass through eyelets in a guide frame 94 carried by the frames or carriages B and then over pulleys 95 mounted in the frames or carriages B, then through other eyelets of the frame 94 and are then wrapped around sections of a main drum designated 96, the cables also being securely fastened to said drum 96. It will be noted from an inspection of Fig. 13 that the cables of the several carriages are wrapped about separate portions of the central drum 96, which portions are formed by a dividing flange 96ª.

In addition to being supported by the cables 91, the frames or carriages B are adapted to be supported by clasp devices generally designated D and supported in any suitable manner from the truck C as by means of the hangers 97. These clasp devices are adapted to engage rods 98 provided on the frame 94. By engagement with the rods the clasp devices positively hold the carriages B against descent. After the truck C has traveled to its outermost position and it is desired that the escape carriages B descend, means are then manually operated so that the rod 98 will be released from the clasp devices D. The rods 98 are held in transverse slots 99 of latch members 100 as shown to advantage in Fig. 17 pivoted to the body of the clasp devices at 101ª. The clasp body at its lower extremity is suitably cut-away to provide a central groove to guide the rods 98 to proper position so as to be received in the slots 99 upon return movement of the latches to normal position. The latches 100 have a transverse connecting portion for the side plates thereof in which the slots 99 are formed. The transverse portion has a weight 101 fastened on its under side, the weight serving to normally maintain the latches in the lowermost position. To the transverse portion is suitably fastened a flexible element in the form of a cord or chain 102. This cord or chain is connected to a shifting lever or member designated 103, terminating exteriorly of the clasp devices in a handle 104. Upon actuation of the handle 104 the latches 100 will be shifted to release the rods 98 and in order that the flexible element 102 will be properly shifted and a sufficient amount thereof taken up, an angle arm 105 is provided which is adapted to bear directly against the element 102 as shown in Figs. 11 and 17. With the construction shown, one of the escape carriages is released and permitted to descend to the ground. Thereupon the other escape carriage is released with an occupant therein, the weight of the occupant serving to cause the escape carriage to travel downwardly. During such downward travel, the other carriage is elevated.

Suitable means is provided in order to govern or check the descent of the carriage. One form of means may be as follows. On the drum shaft which may be designated 106, is fastened a gear wheel 107 which gear wheel meshes with a gear wheel 108 carried by a shaft 109 suitably supported in the truck C. This shaft 109 has mounted rigidly thereon a brake pulley designated 110. Over this pulley passes a flexible brake element designated 111. This element at its ends is connected to a lever 112 as at 113. This lever 112 is pivoted on the shaft 106 and on one side of said shaft the connections 113 are made while on the other side of the shaft a link 114 is pivoted to the lever at 115. The link 114 is pivoted to a lever 116 pivoted at 117 to one of the clasp devices. Truck C has provided thereon a rod 118 on which is mounted a suitable governor device, the one shown having a transverse bar 119 fastened to the rod 118 and having pivoted thereto arms 120, each having a weight 121 mounted on its lower end. A transverse bar 122 which has connection with a weight 123 is adapted to slide on the shaft 118. The bars 119 and 122 rotate with the governor rod 118, the bar 119 being fixed thereon while the bar 122 is slidable thereon. Links 124 are pivoted to the arms 120 and arm 122 and when the weights 121 fly outwardly, under centrifugal force the bar 122 is elevated. Movable with the governor device is a pulley 125 on which normally rests a bifurcated end 126 of the lever 116. Thus it will be understood that as the governor rotates and the weights 121 move upwardly, the pulley 125 will shift the lever 116, link 114, lever 112, and brake band 111, causing the latter to tightly bind against the pulley 110, thereby retarding the rotation of the shaft 106 and accordingly the rotation of the drum 96. The governor rod 118 is rotated by a belt 109$^b$ which passes over a sheave 109$^a$ on the shaft 109 and over the pulley 125 on the rod 118.

It may be mentioned that suitable signal alarm means may be provided in connection with the apparatus. For instance, an alarm such as designated 127, see Fig. 4, may be operated by pressing a button 128 in Figs. 2 and 6 so as to sound an alarm. The button 128 is adapted to be operated upon the downward movement of the operating lever 127 which carries a lug 129 on one arm as shown in Fig. 7 for pressing the button. It might also be mentioned that, after downward movement of the sashes 10 and 11, the sash 11 is adapted to be moved upwardly with the sash 10, the means accomplishing this feature as shown, being a lug 130 provided on sash 11 and a lug 131 provided on sash 10, the latter lug being adapted to engage the lug 130 during the sliding movement of sash 10.

The operation of the apparatus is as follows:—

The actuating lever or member comprising the parts 4 and 5 is pulled downwardly, shifting the arm 19 which arm through the medium of the several parts previously specifically described, shifts the bolt 12 so that they disengage the slots in the sash 10 whereupon the sash 10 falls automatically into the lower portion of the frame A after sill 15 is withdrawn from the path of the sash. Also such movement of the operating lever shifts the link or arm 27 which in turn shifts the rod 25 turning the segments 30 thereon, which due to their engagement with the racks 29 cause the sill 15 to slide out of the path of the sash 11 whereupon the said sash 11 slides to the lower portion of the frame A. Arm or link 41 is also shifted or moved downwardly upon actuation of the lever and this arm 41 moves the pins 40 downwardly thereby causing the arm 39 to move to the horizontal position thus supporting the step 36 and the brace arms 37 to move to a diagonal position. During the downward movement of the step device, the pin 40 which has the arm 41 attached thereto moves or strikes the lever 43, elevating it at one end and accordingly elevating or moving upwardly a slight distance, the arm 45' which due to its pivotal connection with the crank 46, causes said crank 46 to shift the rod 33 moving the lug 34 out of the path of movement of the swinging track frame. Said carriage frame thereupon swings on the pivot 32 and assumes a horizontal position as seen in Figs. 4 and 5. When the frame just described has moved a sufficient extent, the brace rods 48 are sprung laterally by means of the spring 54 so that said brace rods will engage the keepers 55 in order to prevent return movement of the swinging track frame to folded position. Also during the movement of the swinging track frame to the horizontal position, the crank 67 strikes against the lug 68 thereby shifting the rod 65 and accordingly the several levers which operate the rods 71, 74, 76 and the holders 56 for the brace rods 48. It is obvious, of course, that this action takes place before the rods 48 spring laterally as they must be released by the holders. Through the movement of the rod 65, arm 63 is shifted so that it moves the bell crank lever or lock member 61 out of engagement with the slots of the keeper 60 and lug 59, whereupon the bar 58 swings downwardly from its pivot so that the escape carriages B will also swing downwardly and hang pendently. Inasmuch as the carriages B are now pendent and the step 36 is adjacent the carriages, a person may walk onto the step and therefrom mount one of the escape carriages. When the carriage is occupied, the occupant moves the grip ring 87 downwardly so that the flexible element 85, lever 84, link 83, will shift the latch 81, releasing the lug 82, whereupon the truck C may be moved to outermost position beyond the frame and window. It is to be noted from Figs. 4 and 5 that the carriage frame in its projected position is inclined to a slight extent so that the truck C will readily travel outwardly after the latch 81 disengages the lug 82. After the truck has traveled to the outermost position, the occupant grasps the handle 104, turns the same so that the crank 105 and chain 102 will shift the latch 100, thereby releasing the rod 98, whereupon the escape carriage is free to travel downwardly. One carriage is permitted to descend to the fullest extent before the other carriage starts to descend. As the carriage descends, the drum 96 pays out the proper amount of cable 91. When one carriage has descended the other carriage is then released and descends, such action causing the paid out cable to be again wound around the drum and accordingly raising the previously lowered carriage. As the carriages descend, their movement is checked by the governor device previously specifically described. As the governor device moves, it shifts the lever 116 and accordingly the link 114 and arm 112, thereby moving the belt or flexible element 111 relatively to the pulley 110 to the proper extent, in combination with the pulley exerting a braking action.

The device illustrated is to be understood as being but one embodiment of my invention, but the scope of the invention is not limited thereto, as numerous changes in the construction, arangement and functions of the various parts may be made without departing from the spirit and scope of the invention as defined in appended claims.

Having thus described my said invention, what I claim as new and desire to secure by Letters Patent is:—

1. In a fire-escape, a fixed frame, a projectable frame supported thereon, a brace pivoted to the projecting portion of the frame, a keeper on the stationary frame for the brace, and means for urging the brace into engagement with the keeper to anchor the brace when the projectable frame assumes the final position.

2. In a fire escape, a fixed frame, a projectable frame pivotally carried by the fixed frame, a lever mechanism for initiating the projection of the pivoted frame, a prop for holding the pivoted frame in a projected position, a revoluble shaft having a projection for abutting the pivoted frame when closed in the fixed frame, and means for actuating the revoluble shaft by the operation of the lever mechanism.

3. In a fire escape, a sash, bolt means to lock said sash in a closed position, a second sash, a receptacle for receiving said second sash, a sill for locking said second sash in a closed position, a movable frame, escape means carried by said frame, an operating member, and means to shift said bolt means, sill, and frame through movement of said operating member in one direction.

4. In a fire escape, a frame, a frame movable relatively thereto, escape means carried by the second frame and adapted to be moved into an operative position by movement of said second frame, fastening means for said escape means, said fastening means normally holding the escape means against movement, and means for releasing said fastening means through movement of said movable frame.

5. In a fire escape, the combination with a frame, a frame movable relatively thereto, a movable truck on the second frame adapted to be moved into an operative position by movement of the second frame, an escape carriage carried by the truck, means for fastening the truck against movement relatively to the second frame, and means for releasing the fastening means through movement of the second frame.

6. In a fire escape, a fixed frame, a projectable frame pivotally carried by the fixed frame, a lever mechanism for initiating the projection of the pivoted frame, a revoluble shaft having a lug for abutting the pivoted frame when closed in the fixed frame, and a connection between the revoluble shaft and the lever mechanism whereby the pivoted frame is freed upon actuation of the lever mechanism.

7. In a fire escape, a fixed frame having a sash, a projectable frame carried by the fixed frame behind the sash, a sill for supporting the sash, a revoluble shaft having a lug for abutting the pivoted frame, a receptacle on the fixed frame beneath the sash, and means for simultaneously rocking the revoluble shaft to release the pivoted frame and moving the sill to permit sash to drop into the receptacle.

8. In a fire escape, a fixed frame, a sash in the fixed frame, a projectable frame pivoted to the fixed frame behind the sash, a sill for supporting the sash above the receptacle, a revoluble shaft having a lug for abutting the pivoted frame, rack and quadrant devices correlated with the sill, and a lever mechanism for simultaneously operating the revoluble shaft to free the pivoted frame and operate the quadrant to displace the sill from beneath the sash.

9. In a fire escape, a fixed frame, a sash in the fixed frame, a projectable frame pivoted to the fixed frame behind the sash, a sill for supporting the sash above the receptacle, a revoluble shaft having a lug for abutting the pivoted frame, rack and quadrant devices correlated with the sill, a lever mechanism for simultaneously operating the revoluble shaft to free the pivoted frame and operate the quadrant to displace the sill from beneath the sash, and a normally folded step projectable simultaneously through the operation of the revoluble shaft and sill.

10. In a fire escape, a fixed frame, an upper and lower sash in the frame, a bolt for locking the sashes together, a receptacle beneath the sashes, a sill for supporting the lower sash above the receptacle, a revoluble shaft having a lug for abutting the pivoted frame, rack and quadrant devices co-related with the sill, and a lever mechanism for simultaneously rocking the revoluble shaft to free the pivoted frame, retract the locking bolt from the sashes and operate the quadrant to move the sill from beneath the sashes.

11. In a fire escape, a fixed frame having a receptacle, an upper and lower sash in the frame, a bolt for locking the sashes together, a sill for supporting the lower sash above the receptacle, a rack on the sill, a quadrant intermeshed with the rack, and means for simultaneously retracting the locking bolt and operating the quadrant to displace the sill from beneath the lower sash.

12. In a fire escape, a fixed frame having an opening and a receptacle, a projectable escape truck carrying frame pivoted to the fixed frame, a sash in front of the pivoted frame, a sill for supporting the sash above the receptacle, a lug for locking the pivoted frame, a step normally folded within the fixed frame beneath the fixed frame opening, and means for simultaneously moving the locking lug and displacing the sill and extending the step beneath the fixed frame opening.

13. In a fire escape, a fixed frame having an opening and a receptacle, a sash for closing the opening, a sill for supporting the sash above the receptacle, a projectable frame pivoted to the fixed frame behind the sash, a truck supporting an escape carriage on the pivoted frame, a step folded in the fixed frame below the opening, and means for displacing the sill and extending the step whereby the pivoted frame may be projected and the escape carriage reached through the opening.

14. In a fire escape, a fixed frame having an opening, a projectable frame pivoted on the fixed frame in the opening, a truck having an escape carriage supported on the upper end of the pivoted frame, a lock on the fixed frame in normal engagement with the pivoted frame, and means for retracting the lock whereby the pivoted frame assumes the projected position through the medium of the weight of the truck and escape carriage at the upper end.

15. In a fire escape, a fixed frame having an opening, a projectable frame pivoted on the fixed frame in the opening, a truck having an escape carriage supported on the upper end of the pivoted frame, a lock on the fixed frame in normal engagement with the pivoted frame, means for retracting the lock whereby the pivoted frame assumes the projected position through the medium of the weight of the truck and escape carriage at the upper end, and a prop for holding the pivoted frame in the projected position.

16. In a fire escape, a fixed frame having an opening, a projectable frame fitted in the opening and pivoted to the fixed frame, a truck disposed at the upper end of the pivoted frame, an escape carriage carried by the truck and supported in an inaccessible position on the pivoted frame, a lock on the fixed frame in engagement with the pivoted frame, and means for retracting the lock to permit the pivoted frame to assume the projected position through the action of the weight of the truck, and remove the escape carriage support whereby the escape carriage assumes an accessible position.

17. In a fire escape, a fixed frame having an opening, a projectable frame fitted in the opening and pivoted to the fixed frame, a truck disposed at the upper end of the pivoted frame, an escape carriage carried by the truck and supported in an inaccessible position on the pivoted frame, a lock on the fixed frame in engagement with the pivoted frame, means for retracting the lock to permit the pivoted frame to assume the projected position through the action of the weight of the truck and remove the escape carriage support whereby the escape carriage assumes an accessible position, and a step simultaneously projected beneath the opening whereby the escape carriage may be reached.

18. A fire escape including a fixed frame, a projectable frame pivoted in the fixed frame, an escape carriage truck located at the upper end of the pivoted frame, the weight of said truck being adapted to move the pivoted frame to the projected position, and a latch for holding the truck at the upper end of the pivoted frame, said latch being adapted to release the truck by manual operation to permit the truck to assume a position at the lower end of the pivoted frame.

19. A fire escape including a fixed frame, a projectable frame pivoted in the fixed frame, an escape carriage truck located at the upper end of the pivoted frame, the weight of said truck being adapted to move the pivoted frame to the projected position, a latch for holding the truck at the upper end of the pivoted frame, said latch being adapted to release the truck by manual operation to permit the truck to assume a position at the lower end of the pivoted frame, and means for retarding the movement of the truck to the lower end of the pivoted frame.

20. A fire escape including a fixed frame, a projectable frame pivoted in the fixed frame, an escape carriage truck located at the upper end of the pivoted frame, the weight of said truck being adapted to move the pivoted frame to the projected position, a latch for holding the truck at the upper end of the pivoted frame, said latch being adapted to release the truck by manual operation to permit the truck to assume a position at the lower end of the pivoted frame, means for retarding the movement of the truck to the lower end of the pivoted frame, and a lock for holding the truck in its position at the lower end of the pivoted frame.

21. In a fire escape, a fixed frame, a projectable frame pivoted in and normally occupying the fixed frame, an escape carriage truck located at the upper end of the pivoted frame, the weight of the truck effecting the projection of the pivoted frame when said frame is released, a latch manually operable to permit the truck to move to the lower end of the pivoted frame, a friction roller at the upper end of the pivoted frame, and a flexible connection between the truck and the friction roller.

22. A fire escape including a fixed frame, a projectable frame pivoted in the fixed frame, the projectable frame being adapted to automatically assume a substantially horizontal position in the fixed frame, a normally folded prop on the projectable frame, a holder for the prop, and means operated upon movement of the projectable frame to the substantially horizontal position for releasing the prop.

23. A fire escape including a fixed frame, a projectable frame pivoted in the fixed frame, the projectable frame being adapted to automatically assume a substantially horizontal position in the fixed frame, a normally folded prop on the projectable frame, a holder for the prop, means operated upon movement of the projectable frame to the substantially horizontal position for releasing the prop, and means for urging the prop into engagement with the fixed frame.

24. A fire escape including a fixed frame, a pivoted frame normally occupying and locked in the fixed frame, means for unlocking the pivoted frame whereby the pivoted frame automatically assumes a substantially horizontal position, a prop carried by the pivoted frame and normally folded thereagainst, a lug on the pivoted frame for holding the prop, and a trip on the fixed frame for striking the lug and releasing the prop as the pivoted frame assumes its substantially horizontal position.

25. A fire escape including a fixed frame, a pivoted frame normally occupying and locked in the fixed frame, means for unlocking the pivoted frame whereby the pivoted frame automatically assumes a substantially horizontal position, a prop carried by the pivoted frame and normally folded thereagainst, a lug on the pivoted frame for holding the prop, a trip on the fixed frame for striking the lug and releasing the prop as the pivoted frame assumes its substantially horizontal position, and a keeper on the fixed frame for receiving and holding the end of the prop.

26. A fire escape including a fixed frame, a pivoted frame normally occupying and locked in the fixed frame, means for unlocking the pivoted frame whereby the pivoted frame automatically assumes a substantially horizontal position, a prop carried by the pivoted frame and normally folded thereagainst, a lug on the pivoted frame for holding the prop, a trip on the fixed frame for striking the lug and releasing the prop as the pivoted frame assumes its substantially horizontal position, a keeper on the fixed frame for receiving and holding the end of the prop, and a resilient element for urging the end of the prop into engagement with the keeper.

27. A fire escape including a fixed frame, a pivoted frame normally occupying the fixed frame, a lock for the pivoted frame, an escape carriage truck at the upper end of the pivoted frame, an escape carriage carried by the truck, the carriage being normally inaccessible, means for holding the carriage in the inaccessible position, and means for releasing the carriage when the pivoted frame is released by the lock and is permitted to assume a horizontal position by the weight of the truck.

28. A fire escape including a fixed frame, a pivoted frame normally occupying the fixed frame but being projectable by gravity, a normally inaccessible escape carriage supported on the pivoted frame, and means operable to permit the escape carriage to assume an accessible position when the pivoted frame is projected.

29. A fire escape including a fixed frame, a pivoted frame normally occupying the fixed frame and adapted to be moved to a horizontal position with respect to the fixed frame by gravity, an escape carriage normally inaccessibly located at one end of the pivoted frame, means operable to permit the carriage to assume an accessible position upon movement of the pivoted frame to the horizontal position, and means for advancing the carriage to the other end of the pivoted frame.

30. A fire escape including a fixed frame, a pivoted frame normally occupying the fixed frame and having an escape carriage truck at one end the weight of the truck being adapted to move the pivoted frame to a horizontal position, a normally inaccessible escape carriage carried by the truck, means operable to permit the escape carriage to assume an accessible position upon movement of the pivoted frame to the horizontal position, means for permitting the advancement of the truck to the other end of the pivoted frame, and a clamp for preventing the descent of the escape carriage.

31. A fire escape including a fixed frame, a pivoted frame normally occupying the fixed frame and having an escape carriage truck at one end, the weight of the truck being adapted to move the pivoted frame to a horizontal position, a normally inaccessible escape carriage carried by the truck, means operable to permit the escape carriage to assume an accessible position upon movement of the pivoted frame to the horizontal position, means for permitting the advancement of the truck to the other end of the pivoted frame, a clamp for holding the escape carriage in suspension, and means for releasing the clamp to permit the descent of the carriage.

32. A fire escape including a fixed frame, a pivoted frame normally occupying the fixed frame and having an escape carriage truck at one end, the weight of the truck being adapted to move the pivoted frame to a horizontal position, a normally inaccessible escape carriage carried by the truck, means operable to permit the escape carriage to assume an accessible position upon movement of the pivoted frame to the horizontal position, means for permitting the advancement of the truck to the other end of the pivoted frame, a clamp for holding the escape carriage in suspension, means for releasing the clamp to permit the descent of the carriage, and a brake mechanism for controlling the speed of descent of the carriage.

33. A fire escape including a projectable frame having an escape carriage, a normally retracted step, and a lever adapted to simultaneously initiate the projection of the frame and the extension of the step so that the escape carriage may be reached.

In testimony whereof I affix my signature in presence of two witnesses.

JOHN B. JAKSCH.

Witnesses:
S. JAZDZEWSKI,
S. J. JAZDZEWSKI.

Copies of this patent may be obtained for five cents each, by addressing the "Commissioner of Patents, Washington, D. C."